US011396461B2

(12) United States Patent
Dijkstra et al.

(10) Patent No.: US 11,396,461 B2
(45) Date of Patent: Jul. 26, 2022

(54) MASK MAKER MACHINE

(71) Applicant: LIGHT TREE, Amstelveen (NL)

(72) Inventors: Alain Dijkstra, Amstelveen (NL);
Yvonne Johanna Margaretha Houthuijs, Amstelveen (NL)

(*) Notice: Subject to any disclaimer, the term of this patent is extended or adjusted under 35 U.S.C. 154(b) by 780 days.

(21) Appl. No.: 16/377,233

(22) Filed: Apr. 7, 2019

(65) Prior Publication Data

US 2020/0317542 A1    Oct. 8, 2020

(51) Int. Cl.
*C02F 1/461* (2006.01)
*C02F 103/02* (2006.01)
*A45D 44/00* (2006.01)

(52) U.S. Cl.
CPC .......... *C02F 1/4618* (2013.01); *A45D 44/002* (2013.01); *C02F 2103/026* (2013.01); *C02F 2201/46125* (2013.01); *C02F 2201/46145* (2013.01); *C02F 2201/46155* (2013.01); *C02F 2209/02* (2013.01); *C02F 2209/06* (2013.01)

(58) Field of Classification Search
CPC ................ C02F 1/4618; C02F 2209/06; C02F 2103/026; C02F 2201/46125; C02F 2201/46145; A45D 44/002
See application file for complete search history.

(56) References Cited

U.S. PATENT DOCUMENTS

| 2018/0221524 A1* | 8/2018 | Johnson | A61L 2/0047 |
| 2019/0015306 A1* | 1/2019 | Park | A61K 8/9794 |
| 2019/0256386 A1* | 8/2019 | Adams | C02F 1/4618 |

FOREIGN PATENT DOCUMENTS

| CN | 2840861 Y | 11/2006 |
| CN | 101559022 B | 11/2011 |

* cited by examiner

*Primary Examiner* — Nicholas A Smith
(74) *Attorney, Agent, or Firm* — Willie Jacques; Emanus, LLC

(57) ABSTRACT

The present invention discloses mask maker machine for producing a mask of any desired shape. The mask maker machine comprises an emulsification box having an acidic chamber and an alkaline chamber to produce acidic and alkaline water with the help of electrolysis process. The user is able to select a desired pH scale via an input unit and once the desired pH is achieved the raw material is added in the corresponding alkaline or acidic chamber as per the requirement of the mask. The heating element heats the masking solution to a desired temperature for homogenous mixing of the masking solution. Further, the user can put any desired shape of mask mold on a base plate and the masking solution is poured in the mask mold through an outlet valve. Furthermore, the mask maker machine is able to produce the mask of variable pH as per the user skin.

12 Claims, 4 Drawing Sheets

MASK MAKER MACHINE

FIELD OF THE DISCLOSURE

The field of the present invention relates generally to personal care equipment. More specifically, the disclosure relates to a method and system for assembling and using a mask maker machine for personal use.

BACKGROUND OF THE DISCLOSURE

Skin care masks are common cosmetic products for people's skin, especially facial skin care. The household use facial mask machine allows people to make their own beauty facial masks suitable for their skin characteristics. While using the mechanism of facial mask, the raw materials (such as hydrogel, collagen, fruits and vegetables, etc.) should be pulverized and mixed with water to form the liquid mask stock. Then, the stock of facial mask must be heated and imported into the face mold of the mask box for cooling and shaping.

But, the different facial skin has different pH scales. When pH scale is below 5, skin is considered acidic, and acid skin often appears as oily and prone to acne with low elasticity. Skin with a pH of 7.5 or higher is called alkaline skin, lacking acidic oil, causing loss of skin moisture and sensitive skin. When the pH is between 4.5 and 6.5, it is called weakly acidic skin. The oil and water proportion is appropriate, suitable for protecting the skin. Microorganisms such as bacteria are generally alkaline and are difficult to reproduce in weakly acidic skin environments. Mildly acidic skin is the healthiest skin acidity, with a PH of 5.5 being the healthiest.

Various types of devices and methods for producing face masks are available in the prior art. For example, the following patents are provided for their supportive teachings and are incorporated by reference herein.

In the Patent No. CN2840861Y, Luo Jun Chen Hua, discloses an automatic fruit and vegetable face film making machine, which belongs to processing equipment of a cosmetic product. The device uses a juice of melons, fruits and vegetables to make cold and hot face films. However, the device in this prior art is not fully automatic and is able to provide different pH of mask based upon the user skin.

In another Patent No. CN101559022B, Chen Lingwen, discloses a fruit-vegetable facial mask device which includes a stirring grinder and a film-forming device. The stirring grinder is arranged above the film-forming device and comprises a material cup, a stirring shaft, a material cup plug and a material cup base, wherein the stirring shaft is vertically arranged in the center of the material cup and is provided with blades. The upper end and the lower end of the stirring shaft are rotatably connected with the cover of feeding opening and the material cup base respectively, and the material cup base is internally provided with a blanking channel. However, the device has simple design but the device is not able to deliver the desired pH mask based on the user skin. Second, the device is bulkier in size hence not easily portable.

Hence it is concluded from the existing prior art that the existing mask machines are not advanced enough to produce a mask according to the pH scale of the user skin. The existing machines are producing mask by using fruits and vegetables and there is no means by which a user can control the pH scale of the mask to be produced.

Further, the water used in the existing mask machines is in its natural state i.e. neutral water, and the masks produced are also pH neutral, so that the skin with high pH or low pH cannot balance and supplement the treatment effect, thus the cosmetic effect is not accomplished.

The conventional mask machines in order to achieve extraction, heating, and mixing, and finally forming integrated design, is typically provided with a plurality of mixing processing chambers which are bulky, inconvenient to carry, it is possible to greatly reduce the size of the entire apparatus and make it portable and convenient to use.

Thus, there is a need in the art to develop a sophisticated device and method which allows a user to make face mask with considerable easiness and efficiency.

There is a need for an intelligent machine that can produce masks of varied pH by itself according to user need, or the device that has numerous sensors for sensing human skin condition and providing.

Further, there is still a need of a system that is convenient to use, portable in size and easy to manufacture.

SUMMARY OF THE DISCLOSURE

In view of the foregoing disadvantages inherent in the prior-art and the needs as mentioned above, the general purpose of the present disclosure is to provide a device and method for producing a mask according to the pH scale of the user skin.

The present disclosure provides a mask maker machine which is having an emulsification box that is divided in a first compartment and a second compartment. Further, the mask maker machine has a base assembly attached to the bottom wall of the emulsification box, the base assembly has a component plate divided in a first portion and a second portion, a support plate that is situated below the component plate and the side walls between the component plate and the support plate are forming a cavity.

An anode and a cathode are mounted on the first and the second portion of the mounting plate, respectively. Further, the first and the second portion each having a pH meter, a heating element, a temperature sensor, and a flow control valve.

The support plate is having an opening via an outlet valve is delivering a masking solution to a mask mold mounted on a base plate that is located below the base assembly.

According to an aspect of the present disclosure, a user pours water into the emulsification box and selects a desired pH scale based on his/her skin pH via an input unit mounted on the outer surface of the emulsification box or a remote unit e.g. a mobile, a laptop or any other device that is wired or wirelessly connected to the mask maker machine.

Here, the base assembly also includes a controller and a power unit. The controller allows to perform an electrolysis process in the first compartment and the second compartment with the help of cathode and anode, the pH meter continuously measure the pH in the corresponding first and second compartment. Once the desired pH is achieved the controller stops the electrolysis process. Further, the user pours a raw material (e.g. fruit juice, vegetable, and/or collagen) into the emulsification box to produce a masking solution, and selects a desired temperature to heats the masking solution by the heating element, the temperature sensor detects the temperature and controller stops the heating once the desired temperature is achieved, a stirrer is used for homogeneous mixing of the masking solution. The controller opens the flow control valve of the first compartment and/or the second compartment as per the user requirement and pours the masking solution into the mask mold via an outlet valve mounted on the support plate. The base plate is having a mold of a desired shape. After some time, the masking solution stabilizes in the mold of the desired shape and the mask of the desired shape is ready of application. Hence, unlike the present mask making machine is easy to use, portable in size and can produce different face mask of varied pH based on the user skin requirements.

The foregoing has outlined, rather broadly, the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be clearly understood, however, that each of the figures is provided for the purpose of illustration and description only and is not intended as a definition of the limits of the present invention.

BRIEF DESCRIPTION OF THE DRAWINGS

The advantages and features of the present disclosure will become better understood with reference to the following detailed description and claims taken in conjunction with the accompanying drawing, in which:

DETAILED DESCRIPTION OF THE DISCLOSURE

Figure 1:
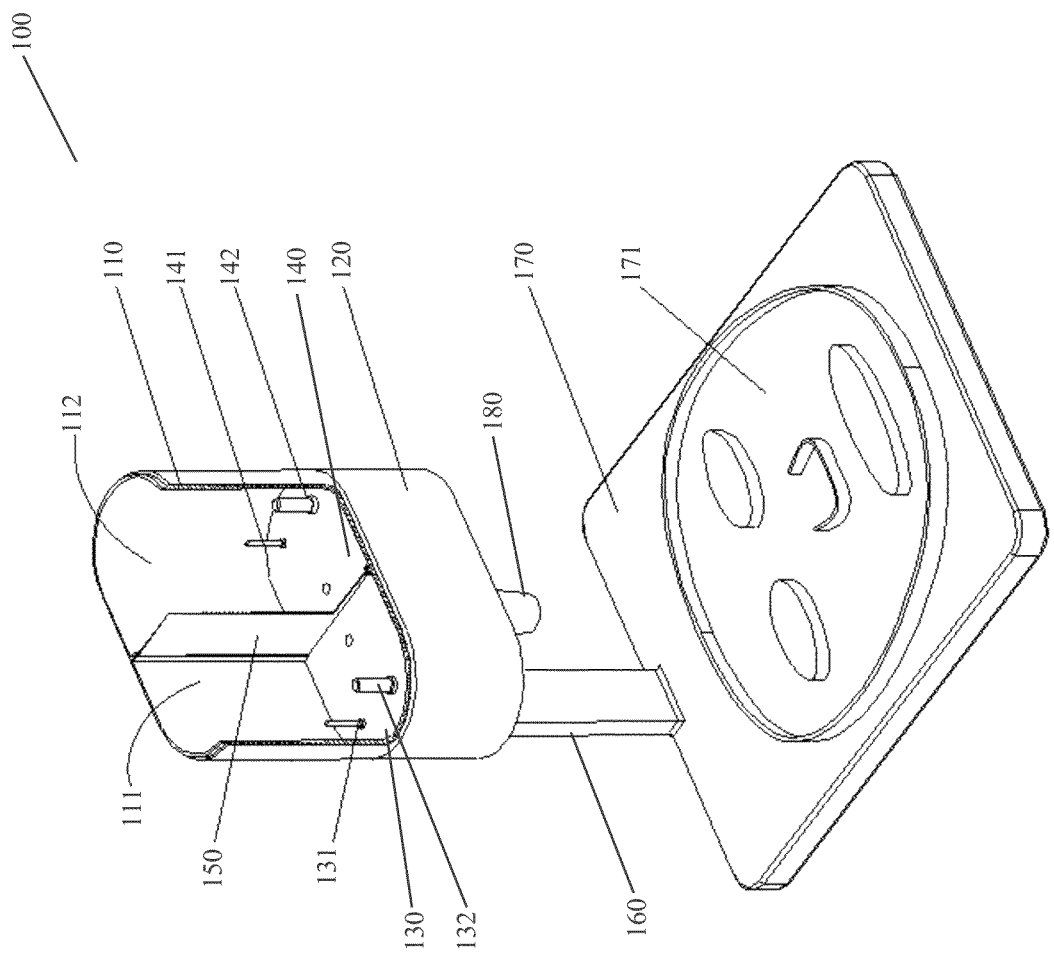
FIG. 1 illustrates an isometric view of a mask maker machine, according to an embodiment of the present invention.

Embodiments of the present disclosure will be described more fully hereinafter with reference to the accompanying drawings in which like numerals represent like elements throughout the figures.

The detailed description and the drawings illustrate specific exemplary embodiments by which the disclosure may be practiced. These embodiments are described in detail to enable those skilled in the art to practice the disclosure. It is understood that other embodiments may be utilized, and other changes may be made, without departing from the spirit or scope of the present disclosure. The following detailed description is therefore not to be taken in a limiting sense, and the scope of the present disclosure is defined by the appended claims. Embodiments of the claims may, however, be embodied in many different forms and should not be construed as limited to the embodiments set forth herein.

It is to be further understood that the present disclosure is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present disclosure.

It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. Further, all conjunctions used are to be understood in the most inclusive sense possible.

References to "one embodiment," "an embodiment," "example embodiment," "various embodiments," etc., may indicate that the embodiment(s) of the disclosure so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

Figure 2:
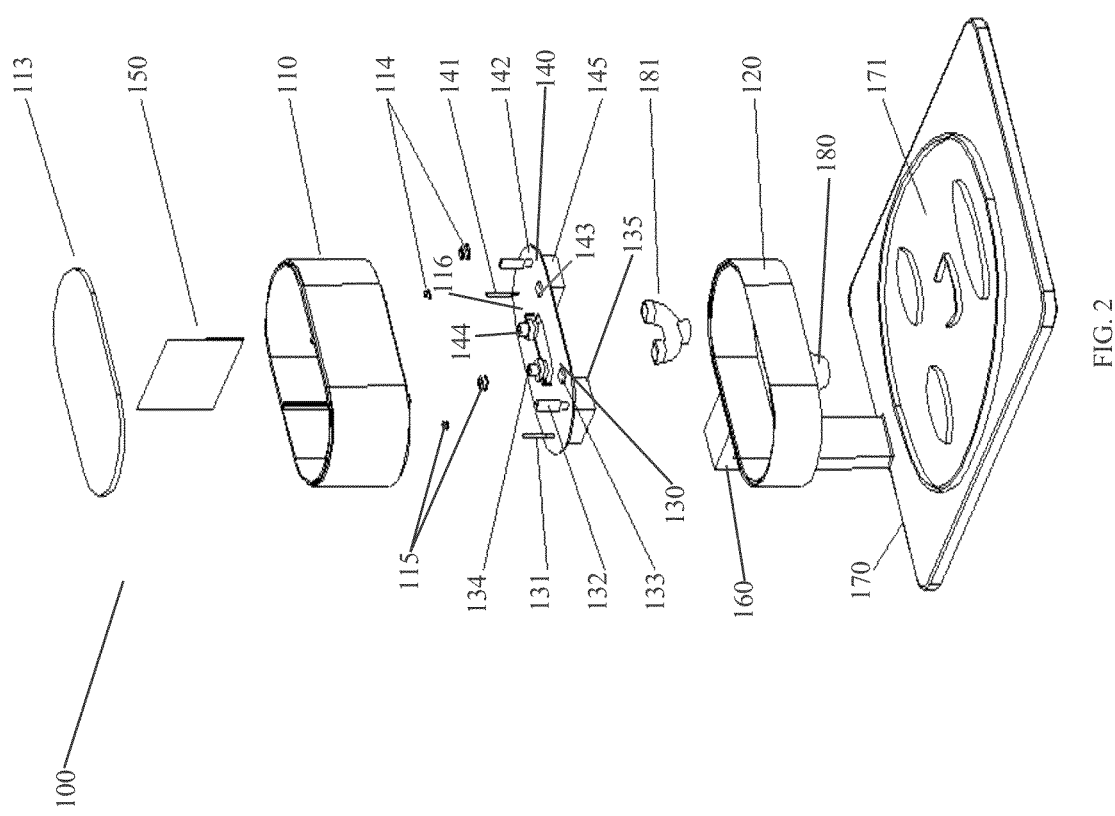
FIG. 2 illustrates an exploded view of the mask maker machine, according to the embodiment of the present disclosure.
Figure 3:
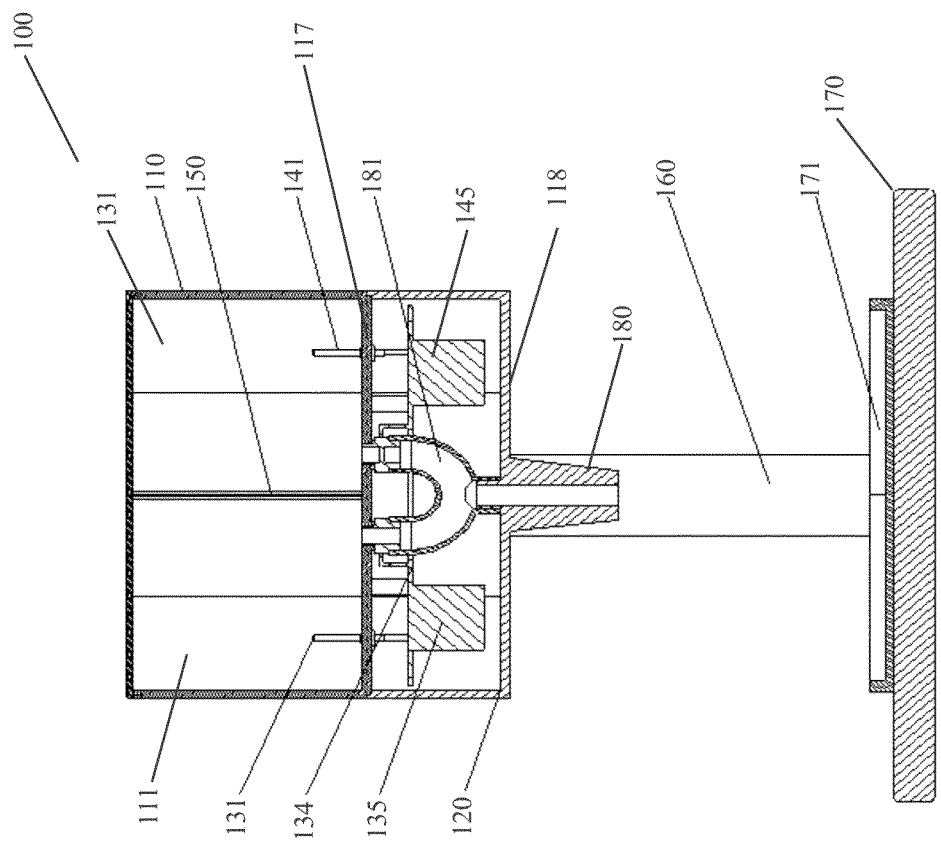
FIG. 3 show a cross-sectional view of the mask maker machine, according to the embodiment of the present disclosure.

Referring from FIG. 1 to FIG. 4, a mask maker machine 100 is shown according to an embodiment of the present disclosure. The mask maker machine 100 as shown in FIG. 1, is comprising an emulsification box 110, a bottom wall 117 (as shown in FIG. 3), and a dividing wall 150 dividing the emulsification box 110 in a first compartment 111 and a second compartment 112. Further, the top end of the emulsification box 110 is covered with a cover 113 made of high-temperature resistant food grade insulating material and can be repeatedly subjected to steam sterilization.

Further, the emulsification box 110 is made of a high-temperature resistant food grade insulating material, has high hydrolytic stability, and is filled with natural water for electrolysis.

A base assembly 120 attached to the bottom wall 117 of the emulsification box 110 comprising: a component plate 116 having a first portion 130 and a second portion 140; a support plate 118 (as shown in FIG. 3) includes an opening portion 180; and side walls. The component plate 116, the support plate 118 and the side wall creating a cavity. Further, the base assembly 120 includes a controller 135 and a power unit 145.

The first portion 130 of the component plate 116 is having following elements: an anode 131, a first heating element 132, a first pH meter 133, a first flow control valve 134 and a first temperature sensor (not shown) as shown in the FIG. 2. The elements of the first portion 130 of the component plate 116 is protruding inside the first compartment 111 via the bottom wall 117 of the emulsification box 110 and are communicatively connected to the controller 135 and the power unit 145 located inside the base assembly 120. The anode 131 is a positive electrode made of cerium oxide and is an excellent catalyst in an acid-alkaline environment The second portion 140 of the component plate 116 is having following elements: a cathode 141, a second heating element 142, a second pH meter 143, a second flow control valve 144 and a second temperature sensor (not shown) as shown in the FIG. 2. The elements of the of the second portion 140 of the component plate 116 is protruding inside the second compartment 112 of the emulsification box 110 via the bottom wall 117, and are communicatively connected to the controller 135 and the power unit 145 located inside the base assembly 120. The cathode 141 is a negative electrode is made of yttrium oxide, and has high electrolysis efficiency.

The bottom wall 117 of the emulsification box 110 is made of flexible sheet or hard material having one or more opening allowing to pass the anode 131, cathode 141, the first pH meter 133 and the second pH meter 143, the first flow control valve 134 and second flow control valve 144, the first heating element 132 and second heating element 142, the first temperature sensor and the second temperature sensor.

Further, sealing rings (114, 115) are made of silicone material ring that completely seals the first pH meter 133, the anode 131, and the second pH meter 143 and the cathode 141 passing through the bottom wall 117 of the emulsification box 110.

The opening portion 180 of the support plate 118 is accommodating an outlet valve 181, the outlet valve 181 is a tee valve having two input sections and an output section, the two input sections are connected to the first flow control valve 134 and the second flow control valve 144. A base plate 170 is connected to the base assembly 120 with a telescopic rod 160. The base plate 170 comprising a mask mold 171 of human face shape as shown in the FIG. 1 and FIG. 2. Further, The output section of the outlet valve 181 opening upon the mask mold 171.

Further, according to an embodiment of the present disclosure, the outer surface of the emulsification box 110 is having a display unit (not shown) that acts as input unit. The display unit allows a user to select a desired pH scale (1-14) and the temperature (temperature range 40-100° C.). Further, the display unit also displays the current pH scale and the temperature of the solution inside the emulsification box 110. The pH scale (pH 1-14) and heating temperature (40-100° C.) can be set by the display button or touch key before making a mask.

Figure 4:
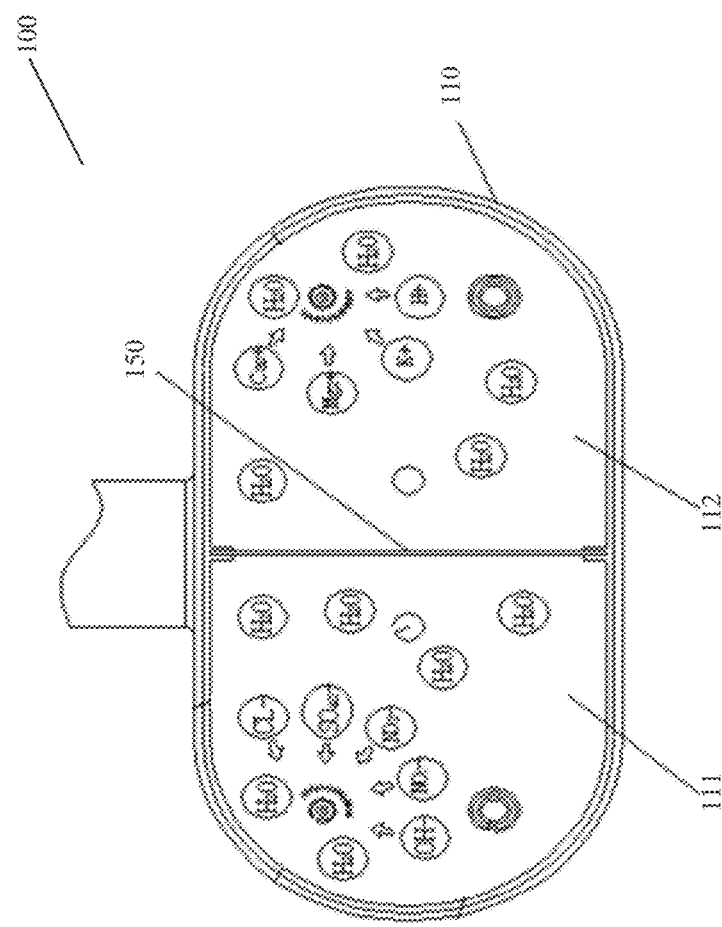
FIG. 4 illustrates a top view of the mask maker machine, according to the embodiment of the present disclosure.

As shown in FIG. 4, the dividing wall 150 is a conductive medium, and a DC voltage is applied to the water contained in the emulsification box 110, and the water is decomposed by the electrodes (anode 131, cathode 141) to separate an alkaline water and an acidic water. Since calcium, magnesium, sodium, potassium and other minerals in the water accumulate at the cathode 141, the hydroxide ions (OH—) increase to become the alkaline water, also called reduced water, which is suitable for drinking and health care; oxygen, sulfuric acid, Sulfur and the like are induced to the anode 131, and hydrogen ions (H+) are added to form acidic water, which is also called oxidized water. Suitable for cleaning, disinfection, beauty, etc.

Due to the action of hydrogen bonds, tap water is usually composed of 13-15 small molecular groups. Under the action of an electric field, the hydrogen bonds of water molecules are opened, and a small molecule water composed of 5-6 water molecules is generated. At the same time, under the action of the electric field, some of the cations Ca2+, Mg2+, K+, H+ in the solution move toward the cathode. According to the strength of the obtained electrons, the H+ ions undergo a reduction reaction, and the electrons become hydrogen, which is reduced due to the concentration of H+ ions. The concentration of hydroxide ions increases, the water body is weakly alkaline, and the pH value is greater than 7, and the water generated by this pole is called alkaline water. At the same time, at the anode, some of the anions Cl—, SO42-, NO3-, NO2-, OH—, etc. move toward the anode. Among the many anions, the hydroxide ions are most likely to lose electrons, then an oxidation reaction occurs, and electrons are lost to generate oxygen and water. As the concentration of hydroxide ions decreases, the concentration of H+ ions increases, the water body is weakly acidic, and the pH value is less than 7, and the water generated by this electrode is called acidic ionized water.

In order to make masks of different pH, it is necessary to first add water to the emulsification box 110 for electrolysis. The pH of the mask depends mainly on whether the hydrogen ion (H+) concentration of the water in the mask is greater or less than the hydroxide ion (OH—) concentration, and the pH can be controlled as long as the concentration of H+ and OH— can be controlled. For example, if a 5.5 pH scale is desired, the OH— in the first compartment 111 that is acidic chamber is most likely to lose electrons to be oxidized to form water, so the OH— is reduced, the concentration is less than the H+ concentration, the water is acidic, and the first pH meter 133 detects the pH of the water in the chamber in real time while electrolyzing. When it reaches the desired pH scale i.e. 5.5, the electrolysis process is stopped by the controller 135, and the desired pH scale is obtained. For example, when 9.5 pH scale is desired, the H+ electron in the second compartment 112 that is alkaline chamber becomes hydrogen, the H+ decreases, the concentration is less than the OH-concentration, the water is alkaline, and the second pH meter 143 detects the pH value of the water in the chamber in real time, when it reaches the desired pH scale i.e. 9.5 the electrolysis process stops.

According to an embodiment of the present disclosure, the dividing wall 150 is an ordinary highly conductive metal sheet which is impermeable to water. The first compartment 111 (acidic chamber) and the second compartment 112 (alkaline chamber) of the emulsification box 110, are simultaneously injected with water, and the anode 131 and the cathode 141 are electrically connected to each other through the water. After the energization, acidic water is formed in the first compartment 111, and alkaline water is formed in the second compartment 112.

Once the appropriate pH water is produced, the mask raw material (fruit juice, collagen etc.) is added, and the raw material of the mask poured into the corresponding compartment as needed (if a user wants to produce acidic mask then pours the raw material in the acidic chamber i.e. first compartment 111, and if the user wants to produce alkaline mask then pours the raw material in the alkaline chamber i.e. second compartment 112), and the water of the other compartment is only made conductive. The user manually stirs the solution stored in the corresponding compartment with a stirrer for homogenous mixing of a masking solution. The corresponding heating element (the first heating element 132 or the second heating element 142) heats the masking solution as per the user input (temperature range 40-100 Degrees Celsius) to make it more fully soluble and flowing. The corresponding temperature sensor (the first temperature sensor or the second temperature sensor) display the masking solution temperature is displayed via the display unit.

After the desired temperature is achieved the corresponding flow control valve (the first flow control valve 134 or the second flow control valve 144) is opened by the controller 135. Further, the masking solution is delivered in to the mask mold 171 of desired shape through the outlet valve 181. Furthermore, the user left the masking solution for some time to get stabilize in the mask mold 171 and once the masking solution is stabilized, a mask of desired shape is ready for application.

In another embodiment, the dividing wall 150 is made of chlor-alkali ion membrane, which is a special cationic selective permeation membrane. The membrane only allows the passage of cations and water molecules, and other anions are difficult to penetrate. After being energized, the cation will move to the cathode 141 and the H+ electron will be reduced to hydrogen. H+ is reduced, and finally, the H+ concentration is less than the OH— concentration, and the water in the alkaline chamber (second compartment 112) is alkaline. At this time, the second flow control valve 144 connected to the alkaline chamber opens to output an alkaline liquid. In the many anions in the acidic chamber (first compartment 111), OH— loses electrons, generating oxygen and water, while the amount of H+ is not changed, only OH— is reduced, and finally the OH-concentration is less than H+ concentration, and the water in the acidic chamber is acidic, if the connection is opened the first flow control valve 134, of the acidic chamber, outputs an acidic liquid.

In other embodiments, acidic water and alkaline water can be prepared in advance and injected into the acidic chamber (first compartment 111) and the alkaline chamber (second compartment 112), respectively, which is more convenient and economical in the case where a larger amount of mask is required to be produced at one time. Of course, it is also possible to directly add acid and alkali suitable chemical materials in the acidic chamber (first compartment 111) and the alkaline chamber (second compartment 112) to directly change the pH of the mask stock solution, thereby making a mask of different pH, but this method requires pH adjustment operation experience, which is not as good. Automatic control is easily achieved in the above electrolyzed water embodiment.

According to an alternate embodiment of the present disclosure, the cover 113 is attached to the emulsification box 110 by means of a latch, a hinge or any other suitable opening mechanism.

According to an alternate embodiment of the present disclosure, the emulsification box 110 could be in round, elliptical, rectangle shape. Further, the base assembly 120 always corresponds to the shape of the emulsification box 110.

According to an alternate embodiment of the present disclosure, the mask maker machine 100 is having a communication means (WI-FI, Bluetooth, NFC) to communicate with a mobile, a laptop, a remote control etc. The user can provide input through the mobile, laptop and remote control.

According to an alternate embodiment of the present disclosure, the mask mold 171 could be of any shape as per the user requirement. e.g. face, hand, chest etc.

Embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although specific embodiments and certain structural arrangements have been illustrated and described herein, it will be clear to those skilled in the art that various other modifications and embodiments may be made incorporating the spirit and scope of the underlying inventive concepts and that the same is not limited to the particular methods and structure herein shown and described except in so far as determined by the scope of the appended claims.

What is claimed is:

1. A mask maker machine comprising:
    an emulsification box includes a housing having side walls and end walls defining an interior space, an open top, a bottom wall, and a dividing wall dividing the interior space in a first compartment and a second compartment;
    a base assembly attached to the bottom wall of the emulsification box comprising:
        a component plate having a first portion and a second portion;
        a support plate includes an opening portion; and
        side walls,
    wherein the component plate, the support plate and the side walls creating a cavity;
    wherein the first portion of the component plate includes:
        an anode, a first heating element, a first pH meter, a first temperature sensor, and a first control valve protruding inside the first compartment via the bottom wall;
    wherein the second portion of the component plate includes:
        a cathode, a second heating element, a second pH meter, a second temperature sensor, and a second flow control valve protruding inside the second compartment via the bottom wall;
    wherein the cavity includes a controller and a power unit; and a base plate having a mask mold is located below the base assembly in order to receive a masking solution, wherein the base plate and the base assembly are connected via a telescopic rod.

2. The mask maker machine according to claim 1, wherein the first compartment is having the anode thereby creating an acidic solution with the help of an electrolysis process.

3. The mask maker machine according to claim 1, wherein the second compartment is having the cathode thereby creating an alkaline solution with the help of an electrolysis process.

4. The mask maker machine according to claim 1, wherein the dividing wall is made of a conductive metal sheet, a chlor-alkali ion membrane or any other suitable material.

5. The mask maker machine according to claim 1, wherein the emulsification box is of elliptical, round, rectangular or any other desired shape.

6. The mask maker machine according to claim 1, wherein the controller is adapted to control the anode, the first heating element, the first pH meter, the first temperature sensor, and the first control valve protruding inside the first compartment via an input unit mounted on an outer surface of the emulsification box.

7. The mask maker machine according to claim 1, wherein the controller is adapted to control the cathode, the second heating element, the second pH meter, the second temperature sensor, and the second flow control valve protruding inside the second compartment via an input unit mounted on an outer surface of the emulsification box.

8. The mask maker machine according to claim 1, the mask maker machine further comprises a communication means to communicate with an input unit mounted on an outside surface of the emulsification box, wherein the communication means allows the mask maker machine to communicate with a mobile, a laptop or any other remote control unit via wired or wireless means.

9. The mask maker machine according to claim 1, wherein the controller allows a user to select a desired pH scale and the controller stops an electrolysis process when the desired pH scale is achieved.

10. The mask maker machine according to claim 1, wherein the first compartment and the second compartment also comprise a stirrer for homogenous mixing of the masking solution.

11. The mask maker machine according to claim 1, wherein the emulsification box, the base plate, the base assembly, and the telescopic rod are detachable from one another.

12. A method of producing a mask, the method comprising:
- pouring water in an emulsification box;
- setting a desired pH scale via an input unit;
- performing an electrolysis process on the water to achieve the desired pH scale;
- analyzing the desired pH scale of the water via a pH meter;
- pouring a raw material into the emulsification box to produce a masking solution;
- heating the masking solution with a heating element;
- measuring a temperature of the masking solution by via a temperature sensor;
- opening a flow control valve after reaching the desired pH scale and a desired temperature; and
- pouring the masking solution in a mask mold via an outlet valve in order to produce the mask.

* * * * *